(12) United States Patent
Quinby et al.

(10) Patent No.: US 7,237,966 B2
(45) Date of Patent: Jul. 3, 2007

(54) POLARITY MAINTAINING MULTI-CONNECTOR OPTICAL CABLE ASSEMBLY

(75) Inventors: Eric S. Quinby, Hickory, NC (US); Eric J. Leichter, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 259 days.

(21) Appl. No.: 10/914,763

(22) Filed: Aug. 9, 2004

(65) Prior Publication Data

US 2006/0029334 A1 Feb. 9, 2006

(51) Int. Cl.
G02B 6/36 (2006.01)
G02B 6/40 (2006.01)
G02B 6/44 (2006.01)

(52) U.S. Cl. ............................ 385/78; 385/76; 385/77; 385/86; 385/100; 385/114; 385/53; 385/54

(58) Field of Classification Search ................... 385/78
See application file for complete search history.

(56) References Cited

U.S. PATENT DOCUMENTS

| | | | |
|---|---|---|---|
| 5,166,995 A | 11/1992 | Briggs et al. | 385/58 |
| 6,587,618 B2* | 7/2003 | Raguin et al. | 385/33 |
| 6,795,632 B1* | 9/2004 | Knapp et al. | 385/135 |
| 2001/0007603 A1 | 7/2001 | Sakurai et al. | |
| 2002/0122641 A1* | 9/2002 | Nakaya | 385/114 |
| 2003/0017741 A1 | 1/2003 | Olson et al. | |
| 2003/0236020 A1* | 12/2003 | Iamartino et al. | 439/445 |
| 2004/0037534 A1* | 2/2004 | Yow et al. | 385/137 |
| 2004/0052472 A1* | 3/2004 | Roth et al. | 385/56 |
| 2004/0062498 A1* | 4/2004 | Del Grosso et al. | 385/114 |
| 2004/0126069 A1* | 7/2004 | Jong et al. | 385/109 |
| 2004/0228634 A1* | 11/2004 | Fricker | 398/135 |
| 2005/0084216 A1* | 4/2005 | Yang et al. | 385/71 |
| 2005/0084221 A1* | 4/2005 | Yang et al. | 385/114 |

FOREIGN PATENT DOCUMENTS

EP 1172673 A2 7/2001

* cited by examiner

*Primary Examiner*—Frank G. Font
*Assistant Examiner*—Ryan Lepisto
(74) *Attorney, Agent, or Firm*—Jeffrey S. Bernard

(57) ABSTRACT

According to certain aspects of the present invention, an optical cable assembly is disclosed having a plurality of optical fibers, each having a first end and a second end. The plurality of optical fibers includes a first group of optical fibers and a second group of optical fibers. A first connector head is attached to the first end of the first group of optical fibers. The first group of optical fibers terminates in an array at a surface disposed on the first connector head. The first connector head includes a first mating structure. A second connector head is attached to the first end of the second group of optical fibers. The second group of optical fibers terminates in an array at a surface disposed on the second connector head. The second connector head includes a second mating structure matable with the first mating structure, whereby the optical cable assembly is configured so as to be matable with another identical optical cable assembly so that polarity is maintained in each of the plurality of optical fibers across the optical cable assemblies. Other related assemblies and kits are disclosed.

28 Claims, 4 Drawing Sheets

POLARITY MAINTAINING MULTI-CONNECTOR OPTICAL CABLE ASSEMBLY

TECHNICAL FIELD

The present invention relates generally to optical cable assemblies. More specifically, the invention relates to optical cable assemblies for coupling a number of optical fibers while maintaining fiber polarity.

BACKGROUND

Conventional fiber optic cables comprise optical fibers that conduct light which is used to transmit voice, video, and data information. An optical ribbon includes a group of optical fibers that are coated with a ribbon common layer, which common layer may be of the ultraviolet (UV) light curable type. Typically, such a ribbon common layer (also known as a matrix) is extruded about a group of individually colored optical fibers that have been arranged in a planar array, and is then irradiated with a UV light source that cures the ribbon common layer. The cured ribbon common layer protects the optical fibers and generally aligns the respective positions of optical fibers in the planar array. Optical fiber ribbons can be connected to multi-fiber connectors, for example, MTP® brand multi-fiber connectors. MTP® connectors can be used in LAN applications, for example, data centers and parallel optics interconnects between servers.

Conventional networking solutions that utilize a 12-fiber MTP® connector assembly, for example, are configured in a point to point system. One MTP® connector is used for all of the fibers to be connected in a given 12-fiber cable. One conventional method of maintaining fiber polarity, i.e., based on a given fiber's transmit to receive function in the system, across such a connector assembly is achieved by flipping fiber orientation in one end of the assembly just before entering the MTP® connector. Such flipped orientation is maintained, for example, by an epoxy plug. Alternatively, "A" and "B" type break-out modules have been used, where the fiber pairs have their orientation reversed (also referred to as "flipped") in the "B" module relative to the orientation in the "A" module.

Typically, transmit/receive pairs of fibers within an array-style connector such as an MTP® connector are arranged in so that the two fibers of a given pair are immediately adjacent each other within the connector. Fiber polarity is addressed by organizing and/or flipping the individual fiber connections at the other end of the MTP® connector assembly. The immediate fiber pairs are thus routed to multi-fiber or single-fiber connectors. In a system utilizing an "A" and "B" type module approach, the fibers within each transmit/receive part of the "B" module are flipped with respect to those in module "A" to address, or correct for, fiber polarity.

MTP® connectors have keys extending from a side surface to mandate orientation when mating to another item, such as another MTP® connector. Also, MTP® connectors have either pins or openings for receiving pins disposed at the surface where the fibers terminate for precise alignment of the fibers. Conventionally, when two MTP® connectors are mated, they are mated key up to key down, using one MTP® connector with pins and another with openings.

U.S. Pat. No. 6,758,600 discloses optical interconnection modules and related assemblies that provide certain useful improvements on the above structures. For example, the patent discloses an optical interconnection module wherein fiber pairs, which may extend from an array-style connector, are arranged so that at least one transmit/receive pair is formed of fibers not immediately adjacent each other within the array-style connector. Also, assemblies are disclosed wherein key positions are not reversed (either both up or both down) across connectors but wherein fiber paths are maintained across the assemblies.

Although the devices and assemblies of U.S. Pat. No. 6,758,600 work well for their intended applications, the multiple mating parts of the assemblies and systems require that various different parts be kept in stock. Thus, for some applications, it would be useful to have assemblies and systems having fewer and more uniform parts.

SUMMARY

According to certain aspects of the present invention, an optical cable assembly is disclosed including a plurality of optical fibers each having a first end and a second end. The plurality of optical fibers includes a first group of optical fibers and a second group of optical fibers. A first connector head is attached to the first end of the first group of optical fibers. The first group of optical fibers terminates in an array at a surface disposed on the first connector head. The first connector head includes a first mating structure. A second connector head is attached to the first end of the second group of optical fibers. The second group of optical fibers terminates in an array at a surface disposed on the second connector head. The second connector head includes a second mating structure matable with the first mating structure, whereby the optical cable assembly is configured so as to be matable with another identical optical cable assembly so that polarity is maintained in each of the plurality of optical fibers across the optical cable assemblies. Various options and modifications are available.

According to certain other aspects of the invention an optical cable assembly matable with a duplicate optical cable assembly is disclosed. The optical cable assembly includes a plurality of optical fibers each having a first end and a second end. The plurality of optical fibers includes a first group of optical fibers and a second group of optical fibers. At least two array-style connector heads are attached to the first end of the first group of optical fibers, each of the first connector heads including a first mating structure. At least two array-style second connector heads are attached to the first end of the second group of optical fibers, each of the second connector heads including a second mating structure. The first and second group of optical fibers are attached to the respective first and second connector heads in a predetermined order so that the first and second connector heads are matable with respective second and first connector heads of the duplicate optical cable assembly via the respective first and second mating structures while maintaining optical fiber polarity. As above, various options and modifications are possible.

According to certain other aspects of the invention, an optical cable assembly is disclosed including a plurality of optical fibers each having a first end and a second end. The plurality of optical fibers includes a first group of optical fibers and a second group of optical fibers. A first connector head is attached to the first end of the first group of optical fibers. The first group of optical fibers terminates in an array at a surface disposed on the first connector head, the first connector head including a first mating structure. A second connector head is attached to the first end of the second group of optical fibers. The second group of optical fibers terminates in an array at a surface disposed on the second connector head, the second connector head including a second mating structure matable with the first mating structure. The plurality of optical fibers are identified by numbers 1 through X, where X is the total number of optical fibers connected to the first and second connector heads, and the optical fibers are attached to the first and second connector heads in numerical order from 1 through X and are paired for external connection: 1 and X, 2 and X–1, etc., until all fibers are paired.

According to certain other aspects of the invention a self-matable optical cable assembly kit is disclosed. The kit includes a plurality of optical cable assemblies. Each optical cable assembly includes a plurality of optical fibers each having a first end and a second end. The plurality of optical fibers includes a first group of optical fibers and a second group of optical fibers. Each assembly also includes a first connector head attached to the first end of the first group of optical fibers. The first group of optical fibers terminates in an array at a surface disposed on the first connector head. The first connector head includes a first mating structure. Each assembly also includes a second connector head attached to the first end of the second group of optical fibers. The second group of optical fibers terminates in an array at a surface disposed on the second connector head. The second connector head includes a second mating structure. Each assembly is matable to another of the optical cable assemblies by connecting the first mating structure of the first connector head of each assembly with the second mating structure of the second connector head of the other assembly. As above, various options and modifications are possible.

DETAILED DESCRIPTION

Figure 1:
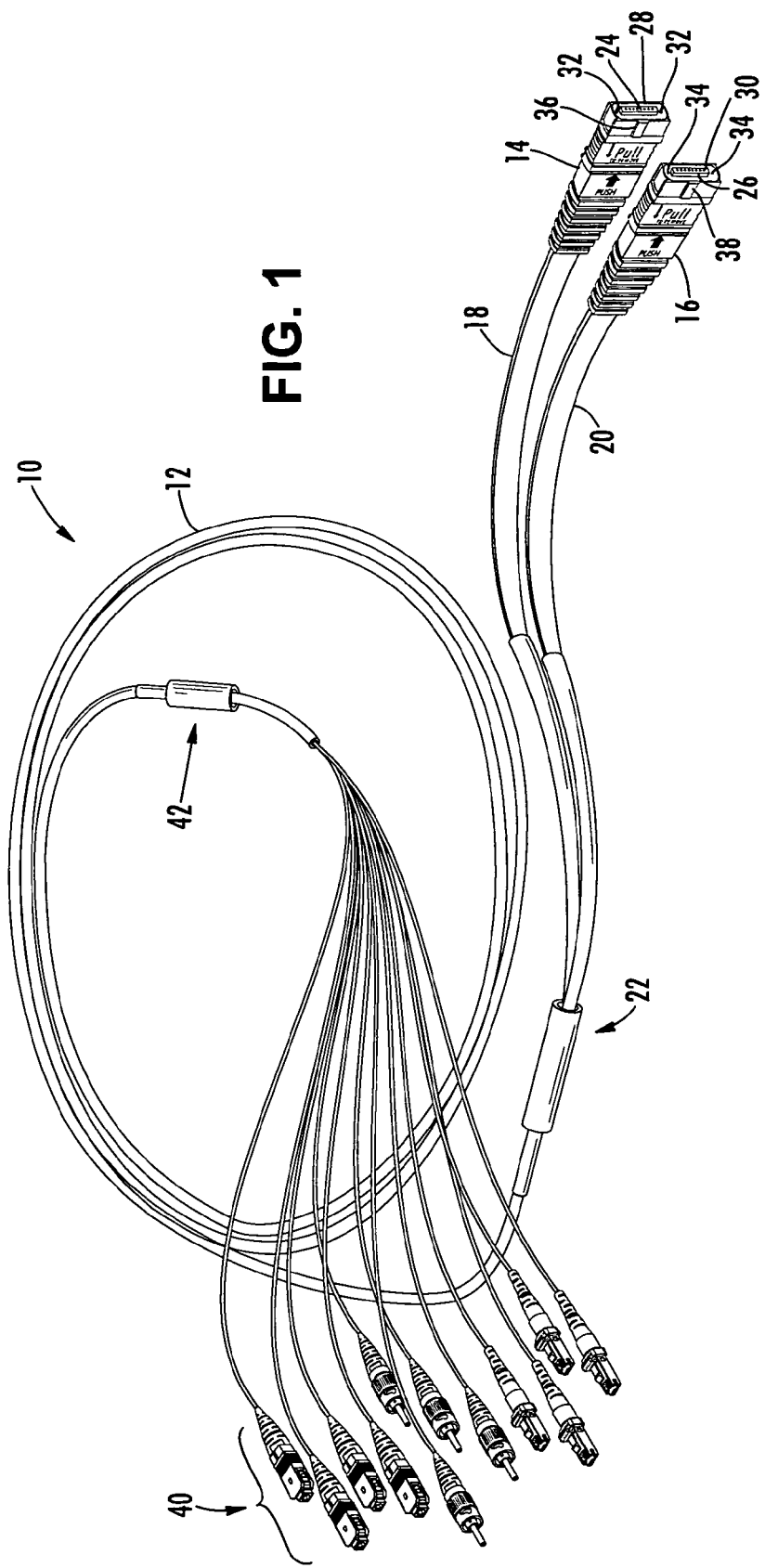
FIG. 1 is a perspective view of one example of an optical cable assembly according to certain aspects of the present invention.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents. Further, the embodiments below, or aspects of the embodiments, may be combined to achieve further embodiments, all within the scope of the present invention.

As shown generally in FIG. 1, an optical cable assembly 10 includes a plurality of optical fibers disposed within fiber optic cable 12 and at least two connector heads 14 and 16 disposed at one end of the optical fibers. As shown, the optical fibers are divided into two groups, each disposed within a respective cable 18 and 20 which, as shown, may comprise ribbon cables. A fan out kit 22 may be present as well.

As shown, connector heads 14 and 16 are MTP® connectors, although other array-style connectors such as MPO connectors or others could be employed. Further, connector heads 14 and 16 could comprise matrix-style connector heads including a plurality of stacked fiber arrays. Accordingly, discussions herein of array-style connectors may include matrix-style connectors, as relevant. The fibers within connector heads 14 and 16 terminate in two arrays 24 and 26 along end surfaces 28 and 30 of the heads. Mating structure is provided to assist in mating connector heads 14 and 16 together. As shown, the mating structure may comprise pins 32 extending from connector head 14 and corresponding openings 34 extending into connector head 16. In such MTP® connectors, pins and openings provide for precise alignment of the fibers within arrays 24 and 26 when connected. Keys 36 and 38 may extend from connector heads 14 and 16 to further assist in orienting and connecting the heads. As discussed below, adaptors and other plug-in structures may also be used to help align the fibers and connector heads in general. It should be understood that, although MTP® connectors with keys, pins and openings are illustrated in FIG. 1, the present invention can be used with any sort of matable array-style connector, including matrix-style connectors having multiple arrays.

As shown in FIG. 1, optical cable assembly 10 may include one or more single or multifiber connectors 40 attached to a second end of the fibers within cable 12. As illustrated, four MT-RJ dual fiber connectors, four SC single fiber connectors, and four ST® brand single fiber connectors are used, but the type and number of connectors is dependent upon the ultimate application. One or more array-style connectors could also be used. A fan out kit 42 may be provided to separate the fibers from cable 12 for connection to the respective connector(s) 40.

As shown, connector heads 14 and 16 are configured so as to be matable with each other (self-matable), although such use might not be typical in all applications. Another possible use for the assembly of FIG. 1 with self-matable heads 14 and 16 is mating the structure to another identical assembly. Thus, connector head 14 of one assembly would be mated with connector head 16 of the other, and vice versa. Such use allows for a connection to be made using two identical assemblies 10, as opposed to two different assemblies (for example, one with pins and one without wherein cables 18 and 20 are formed into a single cable going into a single connector head). Thus, splitting the fibers into two cables 18 and 20, each attached to a connector head 14 and 16, matable with the other allows for an efficient use of fewer parts to make connections in certain applications.

Further, it should be understood that any even number of connector heads 14 and 16 could be used within the scope of the invention. Thus, four, six, eight, etc. heads could be used, with one half of the heads being of one style and the other half being of a style matable to the first half. If so, cable 12 could comprise any sort of cable with sufficient fibers, including ribbon cables with 16, 24 or more fibers, or stacked ribbon cable designs. Thus, the invention is not limited to assemblies as shown in FIG. 1 having only two connector heads 14 and 16. Also, it should be understood that according to certain aspects, the invention includes kits including two or more identical optical cable assemblies such as assembly 10 or others, as described herein. In such situation, use of a plurality of self-matable assemblies provides various advantages in certain applications.

Figure 2:
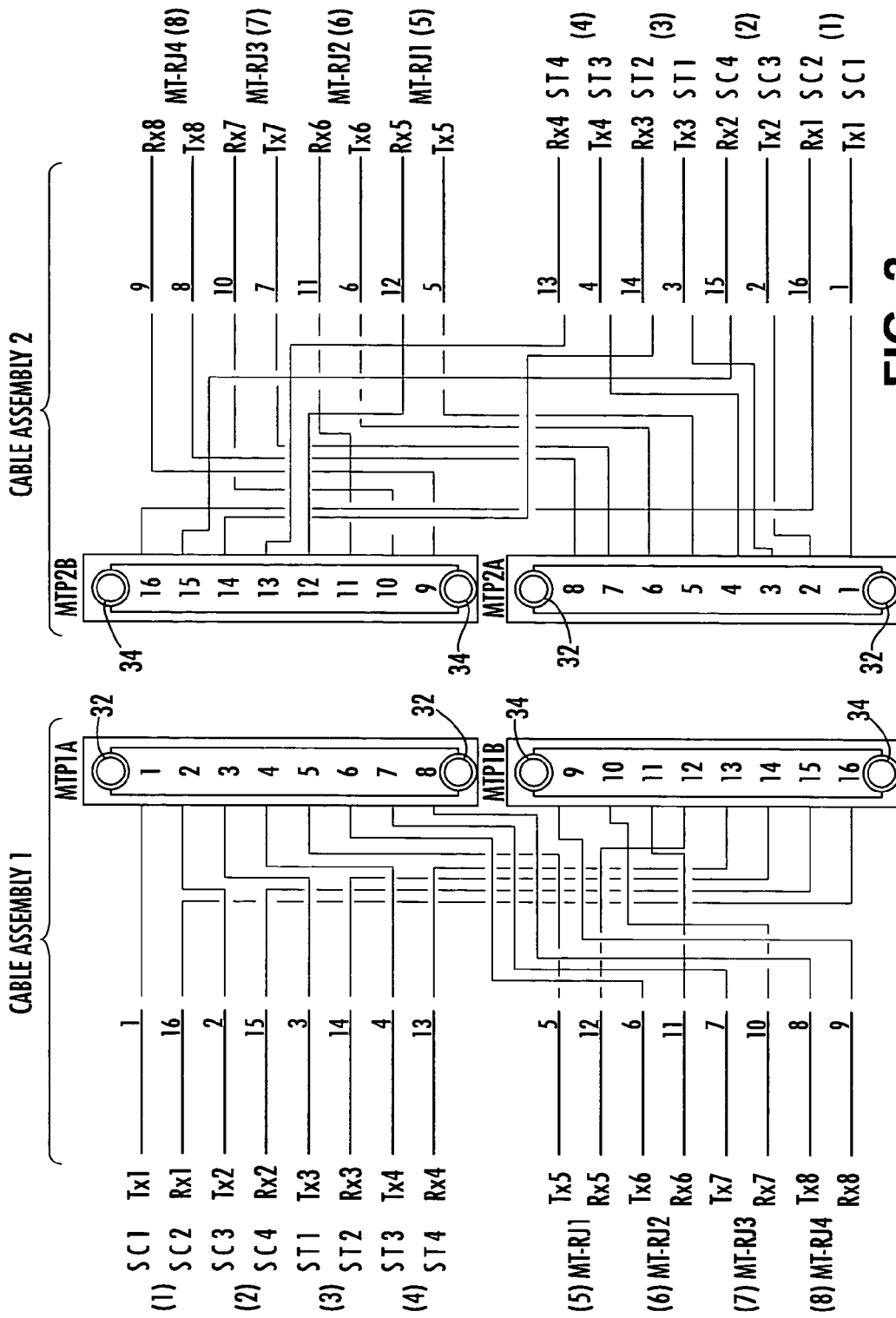
FIG. 2 is a diagrammatical view of one possible configuration of fibers and connectors useful for the assembly of FIG. 1.

FIG. 2 shows one possible fiber connection arrangement for an assembly such as assembly 10 of FIG. 1. As shown, Cable Assembly 1 and Cable Assembly 2 are in the format shown for assembly 10 in FIG. 1 and are identical to each other. Each of the two Cable Assemblies 1 and 2 has two MTP® connector heads (1A, 1B and 2A, 2B, respectively corresponding to connector heads 14 and 16). Connectors 1A and 2A have a first mating structure such as pins 32, and connectors 1B and 2B have a second mating structure such as openings 34 so that heads mate as follows: 1A-2B and 1B-2A. The fibers within the assemblies are numbered 1-16, corresponding to the respective positions 1-16 in which each fiber resides within the arrays at the ends of connector heads. As shown, heads 1A and 2A include positions 1-8 and heads 1B and 2B include positions 9-16, with 16 fibers being used (i.e., all of positions 1-16 have a fiber present in FIG. 2). The fibers in each of the Cable Assemblies are organized into transmit/receive pairs (1)-(8). Each pair has one or two connectors (MT-RJ dual fiber connector, SC single fiber connector, or ST® brand single fiber connector) as indicated.

Fibers 1-16 are routed to corresponding transmit receive pairs (1)-(8) so as to achieve proper polarity across the Cable Assemblies 1 and 2 once assembled. As set forth herein, one possible arrangement is to identify the plurality of optical fibers by numbers 1 through X, where X is the total number of optical fibers connected to the first and second connector heads, and the optical fibers are attached to the first and second connector heads in numerical order from 1 through X and are paired for external connection: 1 and X, 2 and X−1, etc., until all fibers are paired. As shown in FIG. 2, pair (1) includes fibers 1 and 16, pair (2) includes fibers 2 and 15, etc., through pair (8), which includes fibers 8 and 9. Such arrangement could be spread across more than two connector heads in a given assembly, if desired, as described above. When Cable Assemblies 1 and 2 are connected, the mating heads (1A-2B and 1B-2A) can be attached using a conventional key up to key down orientation, using an optional conventional adaptor if desired. Each fiber, whether a transmitting fiber (Tx1-Tx8) or a receiving fiber (Rx1-Rx8) is automatically matched with its proper corresponding fiber, as can be determined by following the fiber paths. Again, the fiber paths and connectivity are automatically correctly determined as long as the proper connector heads are connected. Thus, the use of two such assemblies provides a reliable kit that is simple to use for connecting numerous optical fibers. Also, a user need only stock one model of assembly, since multiple assemblies may be used in one application as compared to if each assembly only had one array-style connector, as discussed above. Finally, since 16 fibers are used with 16 positions, the fiber numbering (as shown) matches the position numbering.

Figure 3:
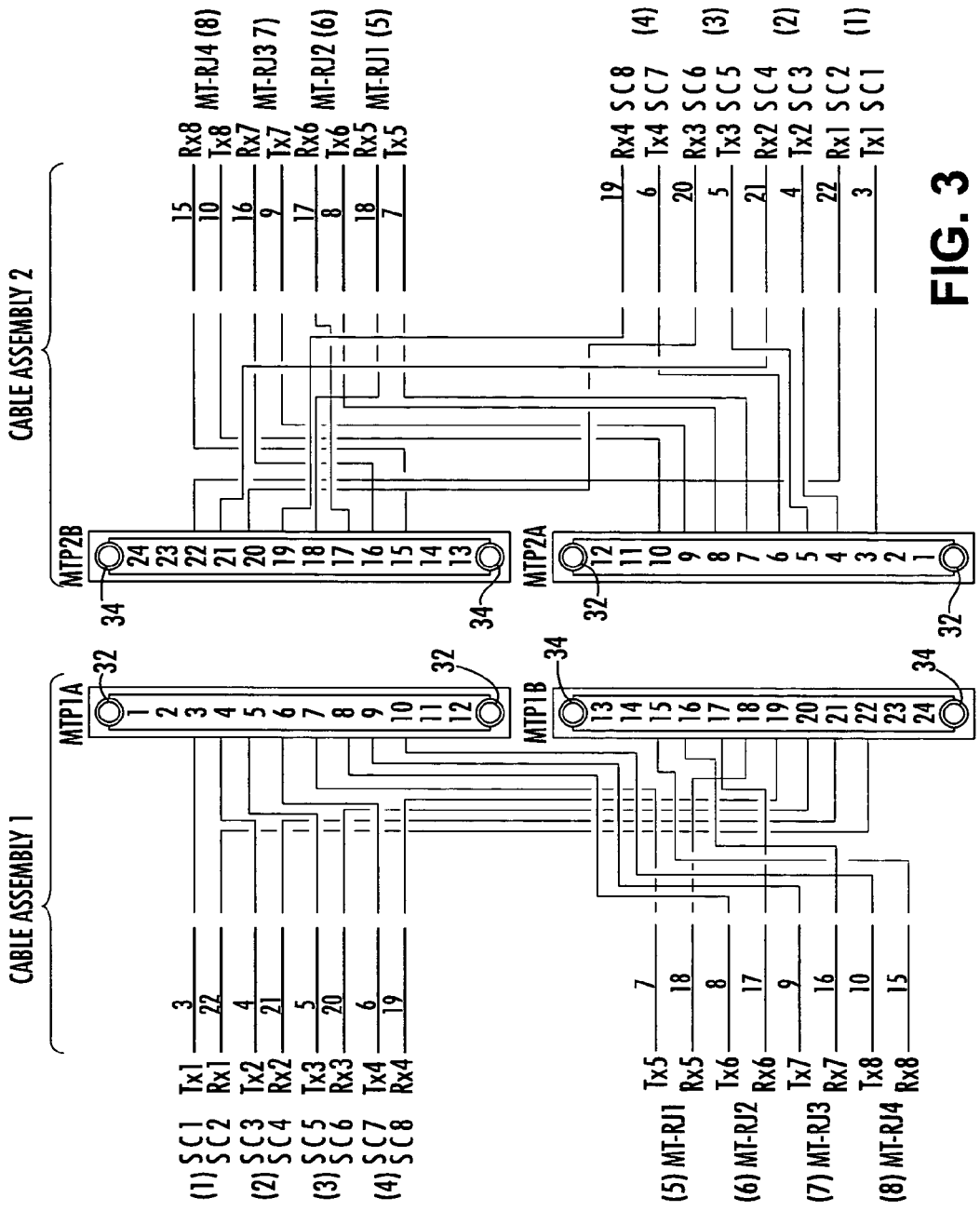
FIG. 3 is a diagrammatical view of another possible configuration of fibers and connectors useful for the assembly of FIG. 1.

FIG. 3 shows a slightly modified version of the schematic of FIG. 2. FIG. 3 shows that there may be more positions (1-24) in the heads than there are fibers (1-16). This may result from using a larger standard head size, as shown, or also from using a smaller number of fibers with the same head size (not shown). If so, as shown, central positions (e.g., 3-10 and 15-22) may be used with outer positions left without fibers. The same connectivity paths and polarity benefits can be obtained by properly routing the fibers, as shown in FIG. 3. Alternatively, other symmetrical fiber position patterns could be used, rather than only using central positions. It should thus be understood that the present invention includes differing numbers of fibers or head slots than shown herein, as desired for certain applications. In particular, use of proper fiber routing and standardized parts can reduce costs in certain situations, rather than particularly designing connector heads (for example, if a non-standard number of fibers were needed such as 28). The fiber connection system described above with regard to FIG. 2 (e.g., 1 and X, 2 and X−1) would still essentially be followed if fewer than all positions were used. However, the positions of the fibers matched would be the fibers occupying the lowest position and the highest position, the second lowest and second highest, etc., until all were matched. Of course, the fibers themselves would be numbered by 1 through X and the same system followed, with fiber identification numbered differing from connector head position numbering. In FIG. 3, the fibers are numbered according to the corresponding head position, rather than from 1-16, for simplicity of illustration only, so that connected paths through the assemblies can be better illustrated.

Figure 4:
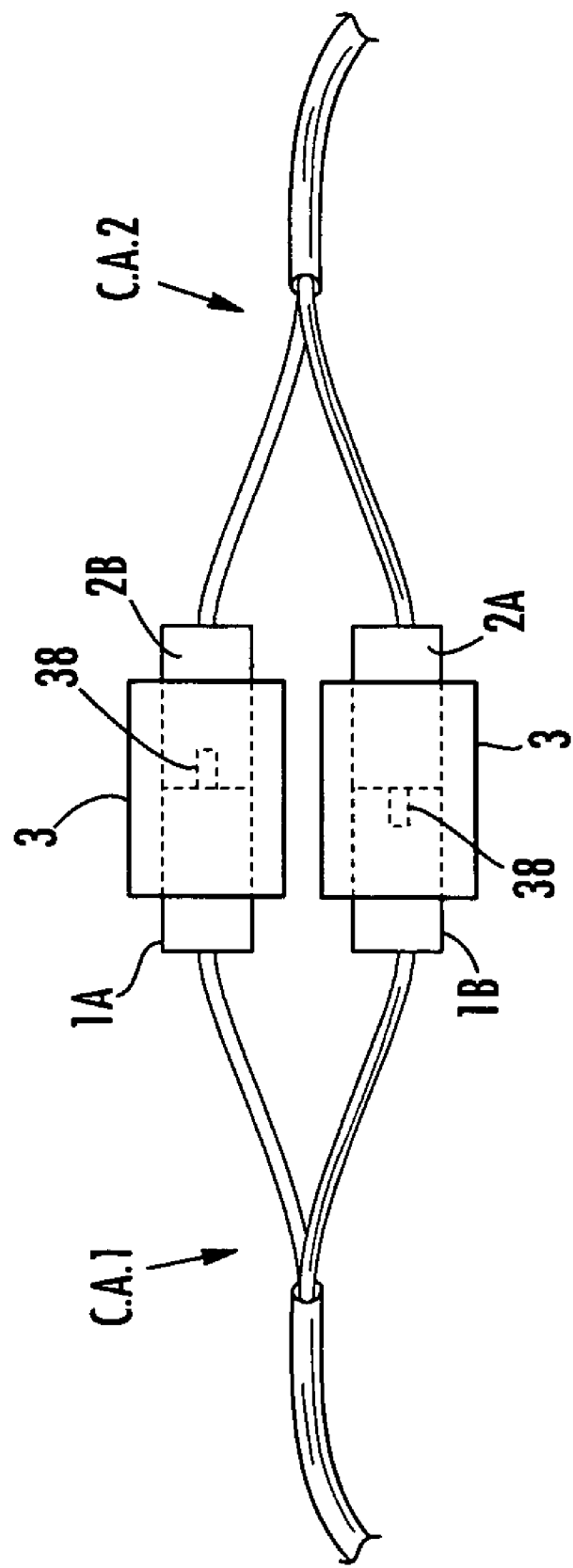
FIG. 4 is a diagrammatical view of two cable assemblies as in FIG. 1 connected via adaptors.

FIG. 4 diagrammatically shows a simple example of two Cable Assemblies 1 and 2, joined with conventional adaptors 3. As shown, keys 36 and 38 are mated key up to key down in each mated pair (keys 38 on top surfaces of heads 1B and 2B shown, keys 36 on bottom surfaces of heads 1A and 2A not shown for clarity). It should be kept in mind that adaptors need not be used, and/or other intermediate structures may be substituted, within the scope of the invention.

Many modifications and other embodiments of the present invention, within the scope of the appended claims, will become apparent to a skilled artisan. Therefore, it is to be understood that the invention is not to be limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides as well.

What is claimed is:

1. An optical cable assembly comprising the following:
    a plurality of optical fibers each having a first end and a second end, the plurality of optical fibers including a first group of optical fibers and a second group of optical fibers;
    a first connector head attached to the first end of the first group of optical fibers, the first group of optical fibers terminating in an array at a surface disposed on the first connector head, the first connector head including a first mating structure;
    a second connector head attached to the first end of the second group of optical fibers, the second group of optical fibers terminating in an array at a surface disposed on the second connector head, the second connector head including a second mating structure instable with the first mating structure, whereby the optical cable assembly is configured so as to be instable with another identical optical cable assembly so that polarity is maintained in each of the plurality of optical fibers across the optical cable assemblies; and
    at least two of the first connector heads, each of the at least two first connector heads being attached to a respective portion of the first group of optical fibers, and further including at least two of the second connector heads, each of the at least two second connector heads being attached to a respective portion of the second group of optical fibers.

2. The optical cable assembly of claim 1, wherein the first mating structure includes pins extending from the surface of the first connector head and the second mating structure includes openings defined in the surface of the second connector head.

3. The optical cable assembly of claim 1, wherein the plurality of optical fibers includes at least one multi-fiber cable.

4. The optical cable assembly of claim 3, wherein the at least one multi-fiber cable includes a ribbon cable.

5. The optical cable assembly of claim 3, wherein the at least one multi-fiber cable includes a first cable containing the first group of optical fibers and a second cable containing the second group of optical fibers.

6. The optical cable assembly of claim 1, further including at least one adaptor attachable to one of the first or second connector heads for connecting the one connector head to another optical fixture.

7. The optical cable assembly of claim 1, wherein at least two of the optical fibers have a single fiber connector attached to their respective second ends.

8. The optical cable assembly of claim 1, wherein at least two of the optical fibers form a pair having a multi-fiber connector attached to their respective second ends.

9. The optical cable assembly of claim 1, wherein the plurality of optical fibers are identified by numbers 1 Through X, where X is the total number of optical fibers connected to the first and second connector heads, and the optical fibers are attached to the first and second connector heads in numerical order from 1 through X and are paired for external connection 1 and X 2 and X−1, etc., until all fibers are paired.

10. An optical cable assembly matable with a duplicate optical cable assembly, the optical cable assembly comprising the following;
a plurality of optical fibers each having a first end and a second end, the plurality of optical fibers including a first group of optical fibers and a second group of optical fibers;
at least two array-style first connector heads attached to the first end of the first group of optical fibers, each of the first connector heads including a first mating stature;
at least two array-style second connector heads attached to the first end of the second group of optical fibers, each of the second connector heads including a second mating structure; and
the first and second group of optical fibers being attached to the respective first and second connector heads in a predetermined order so that the first and second connector heads are matable with respective second and first connector heads of the duplicate optical cable assembly via the respective first and second mating structures while maintaining optical fiber polarity.

11. The optical cable assembly of claim 10, wherein the first mating stricture includes pins extending from the surface of the first connector heads and the second mating structure includes openings defined in the surface of the second connector heads.

12. The optical cable assembly of claim 10, wherein the plurality of optical fibers includes at least one multi-fiber cable.

13. The optical cable assembly of claim 12, wherein the at least one multi-fiber cable includes a ribbon cable.

14. The optical cable assembly of claim 12, wherein the at least one multi-fiber cable includes a first cable containing the first group of optical fibers and a second cable containing the second group of optical fibers.

15. The optical cable assembly of claim 10, further including at least one adaptor attachable to one of the first or second connector heads for connecting the one connector head to another optical fixture.

16. The optical cable assembly of claim 10, wherein at least one of the optical fibers has a single fiber connector attached to its respective second end.

17. The optical cable assembly of claim 10, wherein at least two of the optical fibers have a multi-fiber connector attached to their respective second ends.

18. The optical cable assembly of claim 10, wherein the plurality of optical fibers are identified by numbers 1 through X, where X is the total number of optical fibers connected to the first and second connector heads, and the optical fibers are attached to the first and second connector heads in numerical order from 1 through X and are paired for external connection: 1 and X, 2 and X−1, etc., until all fibers are paired.

19. A self-matable optical cable assembly kit comprising:
a plurality of optical cable assemblies, each optical cable assembly including;
a plurality of optical fibers each having a first end and a second end, the plurality of optical fibers including a first group of optical fibers and a second group of optical fibers;
a first connector head attached to the first end of the first group of optical fibers, the first group of optical fibers terminating in an array at a surface disposed on the first connector head, the first connector head including a first mating structure; and
a second connector head attached to the first end of the second group of optical fibers, the second group of optical fibers terminating in an array at a surface disposed on the second connector head, the second connector head including a second mating structure;
each of the plurality of optical cable assemblies matable to another of the optical cable assemblies by connecting the first mating structure of the first connector head of each assembly with the second mating structure of the second connector head of the other optical cable assembly and
wherein each of the optical cable assemblies includes at least two of the first connector heads, each of the at least two first connector heads being attached to a respective portion of the first group of optical fibers, and wherein each of the optical cable assemblies includes at least two of the second connector heads, each of the at least two second connector heads being attached to a respective portion of the second group of optical fibers.

20. The self-matable optical cable assembly kit of claim 19, wherein the first mating structure includes pins extending from the surface of the first connector head and the second mating structure includes openings defined in the surface of the second connector head.

21. The self-matable optical cable assembly kit of claim 19, wherein the plurality of optical fibers in each optical cable assembly includes at least one multi-fiber cable.

22. The self-matable optical cable assembly kit of claim 21, wherein the at least one multi-fiber cable includes a ribbon cable.

23. The self-matable optical cable assembly kit of claim 21, wherein the at least one multi-fiber cable includes a first cable containing the first group of optical fibers and a second cable containing the second group of optical fibers.

24. The self-matable optical cable assembly kit of claim 19, wherein the first and second groups of optical fibers are attached to the respective first and second connector heads in a predetermined order so that polarity is maintained in each of the plurality of optical fibers across the connection assemblies.

25. The self-matable optical cable assembly kit of claim 19, wherein each of the optical cable assemblies includes at least one adaptor attachable to one of the first or second connector heads for connecting the one connector head to another optical fixture.

26. The self-matable optical cable assembly kit of claim 19, wherein at least two of the optical fibers in each optical cable assembly have a single fiber connector attached to their respective second ends.

27. The self-matable optical cable assembly kit of claim 19, wherein at least two of the optical fibers in each optical cable assembly form a pair having a multi-fiber connector attached to their respective second ends.

28. The self-matable optical cable assembly kit of claim 19, wherein the plurality of optical fibers in each optical cable assembly are identified by numbers 1 through X, where X is the total number of optical fibers connected to the first and second connector heads, and the optical fibers are attached to the first and second connector heads in numerical order from 1 through X and are paired for external connection: 1 and X, 2 and X−1, etc., until all fibers are paired.

* * * * *